United States Patent
Monnier et al.

(10) Patent No.: US 11,405,827 B2
(45) Date of Patent: Aug. 2, 2022

(54) STORAGE METHOD OF DIGITAL FILES CARRIED OUT BY A DETERMINIST AVIONIC NETWORK WITH PREDETERMINED ROUTING, AND ASSOCIATED AVIONIC COMMUNICATION SYSTEM

(71) Applicant: THALES, Courbevoie (FR)

(72) Inventors: Stéphane Monnier, Mérignac (FR); Emmanuel Roger, Mérignac (FR); Philippe Dumercq, Mérignac (FR)

(73) Assignee: THALES, Courbevoie (FR)

( * ) Notice: Subject to any disclaimer, the term of this patent is extended or adjusted under 35 U.S.C. 154(b) by 172 days.

(21) Appl. No.: 16/889,235

(22) Filed: Jun. 1, 2020

(65) Prior Publication Data

US 2020/0389820 A1 Dec. 10, 2020

(30) Foreign Application Priority Data

Jun. 4, 2019 (FR) .................................... 19 05896

(51) Int. Cl.
| | |
|---|---|
| *H04W 28/14* | (2009.01) |
| *B64D 45/00* | (2006.01) |
| *G08G 5/00* | (2006.01) |
| *H04W 4/12* | (2009.01) |
| *H04W 28/02* | (2009.01) |

(52) U.S. Cl.
CPC ............ *H04W 28/14* (2013.01); *B64D 45/00* (2013.01); *G08G 5/0004* (2013.01); *H04W 4/12* (2013.01); *H04W 28/0231* (2013.01)

(58) Field of Classification Search
CPC .... B64D 45/00; G08G 5/0004; G06F 3/0604; G06F 3/067
See application file for complete search history.

(56) References Cited

U.S. PATENT DOCUMENTS

| | | | | |
|---|---|---|---|---|
| 2003/0105716 | A1* | 6/2003 | Sutton, Jr. ............. | H04L 9/3247 705/50 |
| 2003/0203734 | A1* | 10/2003 | Igloi ................... | H04L 63/0428 455/431 |
| 2007/0027589 | A1* | 2/2007 | Brinkley .............. | G08G 5/0013 701/3 |
| 2009/0019054 | A1* | 1/2009 | Mace .................. | H04L 67/1006 |
| 2016/0154391 | A1* | 6/2016 | Pavaskar ................ | G05B 15/02 701/3 |

FOREIGN PATENT DOCUMENTS

CN 104714966 A 6/2015

OTHER PUBLICATIONS

French Search Report, from the French Patent Office in counterpart French Application No. 1905896, dated Mar. 5, 2020.

* cited by examiner

*Primary Examiner* — Jael M Ulysse

(74) *Attorney, Agent, or Firm* — ArentFox Schiff LLP

(57) ABSTRACT

The present invention relates to a storage method of digital files carried out by a determinist avionic network with predetermined routing. This method comprises a phase (PE) for writing digital files comprising the steps of determining by an end system sending a digital file to be stored, associating a time reference with the digital file to be stored, sending the digital file to be stored with the associated time reference to K separate switches using one or several data frames, generating, via at least some of the switches, a copy of the digital file to be stored and storing this copy in the storage unit of each of these switches with the associated time reference.

17 Claims, 3 Drawing Sheets

STORAGE METHOD OF DIGITAL FILES CARRIED OUT BY A DETERMINIST AVIONIC NETWORK WITH PREDETERMINED ROUTING, AND ASSOCIATED AVIONIC COMMUNICATION SYSTEM

CROSS-REFERENCE TO RELATED APPLICATIONS

This application claims priority to French Application No. 19 05896, filed on Jun. 4, 2019. The disclosure of the priority application is incorporated in its entirety herein by reference.

FIELD OF THE INVENTION

The present invention relates to a storage method of digital files carried out by a determinist avionic network with predetermined routing.

The present invention also relates to an associated avionic communication system.

BACKGROUND OF THE INVENTION

Modern avionic architectures require the storage, embedded in aircraft, of significant quantities of digital data.

Some digital data are of different natures and may for example comprise avionic data that are essential for proper working of the aircraft and data of lower criticality, the saving of which on the aircraft is of a certain interest. The latter data may for example comprise maintenance data, safety logs as well as any other type of data, for example data from dedicated end systems for performing in-flight backups.

A large volume of data also exists that must be read by different avionic end systems during the use thereof. These data include databases for example containing cartographical data, operating data, procedures to be followed, etc.

Thus, in most cases, the storage of these data must be resilient so as to minimize any loss of these data.

To that end, modern architectures use storage locations generally arranged in the end systems making up the avionic network. These locations may optionally be redundant with respect to one another as a function of the nature of the stored data.

The communication with these locations in the corresponding avionic network is done according to the communication protocol imposed by this network. This in particular makes it possible to guarantee the equivalent security level for all of the end systems of such a network.

The use of storage locations in the avionic networks is nevertheless faced with a certain number of difficulties.

First, the increased volume of data to be stored requires multiplying these locations in various end systems, which presents difficulties in their integration into the avionic network and substantial costs.

Furthermore, as a function of the nature of the stored data, it is necessary to manage the access rights to these data and to ensure their segregation and redundancy as well as deterministic access.

SUMMARY OF THE INVENTION

The present invention aims to address these difficulties and therefore to propose a method for storing data embedded in an aircraft making it possible to avoid the use of dedicated storage locations in the avionic end systems and to ensure, particularly simply, the management of these data as a function of their nature.

To that end, the invention relates to a storage method of digital files carried out by a determinist avionic network with predetermined routing;

the avionic network being implemented by a communication system comprising at least M end systems and at least N switches connected to one another;

each end system sending and/or receiving digital files;

each switch being able to send digital files over the avionic network using data frames, each of at least some switches comprising a storage unit configured to store at least some of these digital files;

each data frame comprising an identifier defining the origin of this frame in a definite manner.

The method comprises a phase for writing digital files comprising the determination, by an end systems sending a digital file to be stored corresponding to a modified original file or a new created digital file; associating a time reference with the digital file to be stored; sending the digital file to be stored with the associated time reference to K separate switches using one or several data frames, the number K being less than or equal to the number N; generating, via at least some of the switches, a copy of the digital file to be stored and storing this copy in the storage unit of each of these switches with the associated time reference.

According to other advantageous aspects of the invention, the method comprises one or more of the following features, considered alone or according to all technically possible combinations:

- the time reference associated with the digital file to be stored comprises a local date determined by the corresponding sending end system and a reference point relative to this sending end system;
- the reference point relative to a sending end system is a starting number of this sending end system, advantageously the local date determined by this sending end system corresponding to the time elapsed since it was started;
- the step for sending the digital file further comprises generating an integrity digest for the or each data frame transporting the digital file to be stored;
- a copy of the digital file to be stored is stored in the storage unit of the corresponding switch only when the integrity digest of the or each frame transporting this file is verified;
- the digital file to be stored is sent without verification of its receipt by the corresponding switches;
- a step for verifying that at least L switches have received the digital file to be stored, the number L being less than or equal to the number K;
- the avionic network is according to a communication protocol of type ARINC 664 P7;
- the digital files to be stored corresponding to a same original file are transported by data frames having a same virtual link defined by said protocol;
- the file to be stored is sent by the corresponding sending end system in multicast mode;
- a phase for reading digital files comprising the following steps:
    sending K requests to K separate switches using a frame, in order to restore each copy of a file to be read stored in the storage unit of the corresponding switch;

receiving responses to at least some of the sent requests, each response comprising the time reference associated with the corresponding copy of the file to be read;

analyzing received time references and selecting the time reference corresponding to the most recent moment in time;

defining the file to be read by its copy associated with the selected time reference;

each of said responses further comprises the corresponding copy of the file to be read;

the step for defining the file to be read further comprises recovering the copy of the file to be read associated with the selected time reference;

the implementation duration of the step for receiving responses is limited by a predetermined threshold;

the reading phase further comprises a step for verifying an integrity digest of the or each data frame transporting the copy of the file to be read associated with the selected time reference;

each received request is authenticated by the corresponding switch by using the identifier of the frame transporting this request;

the avionic network is according to a communication protocol of type ARINC 664 P7; and each received request is authenticated by the corresponding switch by using a virtual link of the frame transporting this request, the virtual link being defined by said protocol.

The invention also relates to an avionic communication system comprising at least M end systems and at least N switches connected to one another, said end systems and switches being configured to carry out the method as previously defined.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
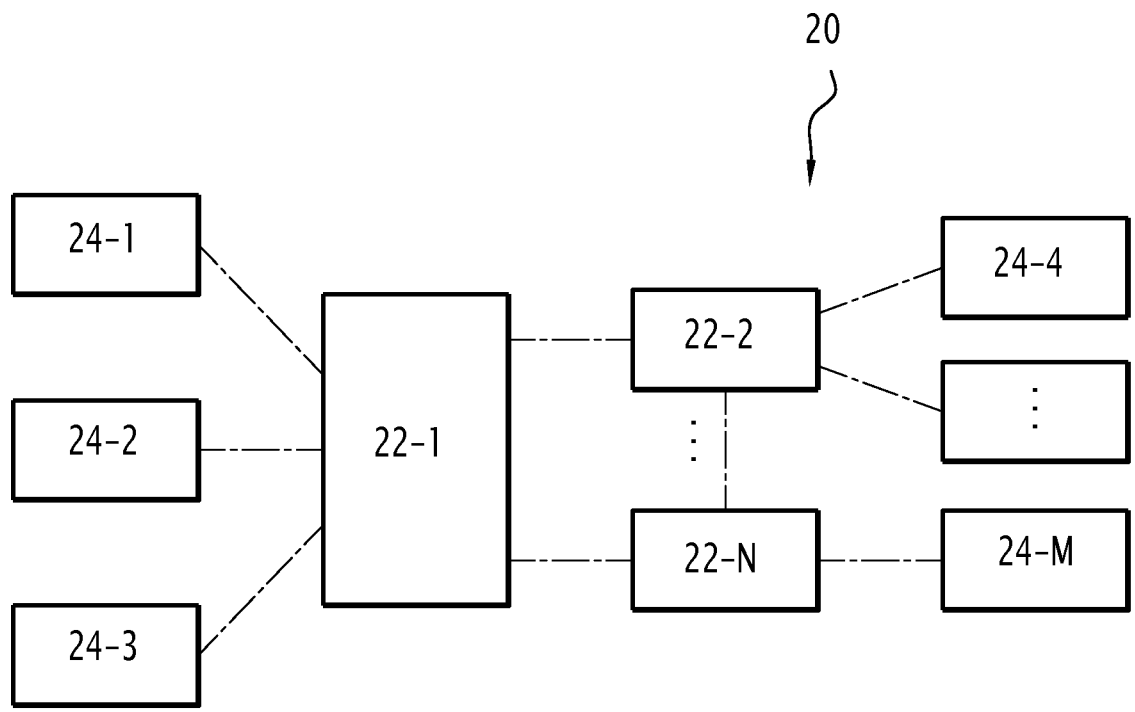
FIG. 1 is a schematic view of a communication system according the invention, the communication system including at least N switches.

The communication system 20 of FIG. 1 is embedded in an aircraft, such as an airplane.

This communication system 20 implements the operation of an avionic network.

According to one specific exemplary embodiment described hereinafter, this avionics network makes it possible to transmit sensitive data between different avionic systems. Sensitive data in particular refers to any data for which the loss or a transmission delay may affect the safety of the aircraft.

The avionic network makes it possible to transmit data frames according to a determined transmission protocol.

According to the invention, this transmission protocol uses predetermined routing, makes it possible to transmit the data frames deterministically and makes it possible to identify the origin of each frame in a definite manner.

Hereinafter, "predetermined routing" refers to routing according to which each frame is conveyed in the network according to predetermined rules.

These predetermined rules are in particular stored in a configuration table of each switch implementing the avionics network and define the conveying of each frame within this switch.

Thus, for example, this is the case when the configuration table of each switch defines, for each frame, an input port and one or several output ports, or when the configuration table of each switch defines, for each frame, one or several output ports.

Transmission of the data frames deterministically refers to the way in which data frames are transmitted making it possible to determine, for each data frame, a maximum transmission time, called maximum latency, and to guarantee that such a frame will be transmitted under all circumstances in a time that may not exceed this maximum latency.

Lastly, in order to identify the origin of each data frame in a definite manner, such a frame for example comprises an identifier comprising an identifier of the end system having sent this frame.

Furthermore, advantageously, the avionic network is redundant and to that end comprises several redundancy plans making it possible to transmit redundant data frames independently. In the remainder of the disclosure, the avionic network will be explained in connection with a single redundancy plan. However, it must be understood that any feature described below remains applicable to each redundancy plan of such a network.

In the example described below, the transmission protocol of the avionic network is of type ARINC 664 P7. This in particular means that this transmission protocol is according to standard ARINC 664 P7, the version of which will be selected by one skilled in the art as a function of each concrete implementation of the communication system.

Thus, as is known in itself, in the case where the transmission protocol is of type ARINC 664 P7, each frame according to this protocol comprises a header in particular including a field called "MAC DEST".

Furthermore, as is also known in itself, two bytes of the MAC DEST field correspond to a value VL called "virtual link" and defining the path of the frame. The frames including a same value VL form a same flow.

The value VL is stored in the configuration table of each switch through which the flow corresponding to this value VL passes and thus makes it possible to convey each frame within this switch.

Within the meaning of the present invention, the value VL of each frame defines the identifier of this frame.

As is also known in itself, each frame further comprises a wanted data field.

According to other exemplary embodiments, the transmission protocol of the avionic network has any other type making it possible to make the avionic network compliant with the aforementioned features, that is to say, of making the network deterministic, with predetermined routing, advantageously redundant, and making it possible to identify the origin of each data frame in a definite manner.

In reference to FIG. 1, the communication system 20 comprises at least N switches 22-1, . . . , 22-N and at least M end systems 24-1, . . . , 24-M.

Each end system 24-1, . . . , 24-M is integrated into an avionic system and ensures the communication of this system with the avionic network.

Thus, as a function of the avionic system in which it is integrated, each end system 24A, ..., 24N can send and/or receive data frames according to said transmission protocol.

In particular, each end system 24-1, ..., 24-M can send and/or receive digital files transported via the avionic network using one or several frames.

In other words, each end system 24-1, ... 24-M is able to send a digital file by incorporating at least part of the latter into the wanted data field of a data frame and/or to form a digital file from the wanted data field of one or several received data frames.

The digital files thus received or sent can be of different natures and in particular correspond to data intended to be stored in the aircraft.

Thus, these files for example correspond to data relative to the operation of different avionic systems, maintenance data, security logs, etc.

Each end system 24-1, ..., 24-M is connected to at least one of the switches 22-1, ..., 22-N via transmission means and via at least one port of this switch. The transmission means for example have a twisted pair cable or any other type of cable allowing a two-way data transmission.

Each of the switches 22-1, ..., 22-N for example has a substantially identical structure. According to another exemplary embodiment, at least one of the switches 22-1, ..., 22-N has a different structure. Thus, in the example described below, at least one of the switches 22-2, ..., 22-N can be devoid of storage unit.

Hereinafter, only the structure of the switch 22-1 will be expended in detail in reference to FIG. 2.

Figure 2:
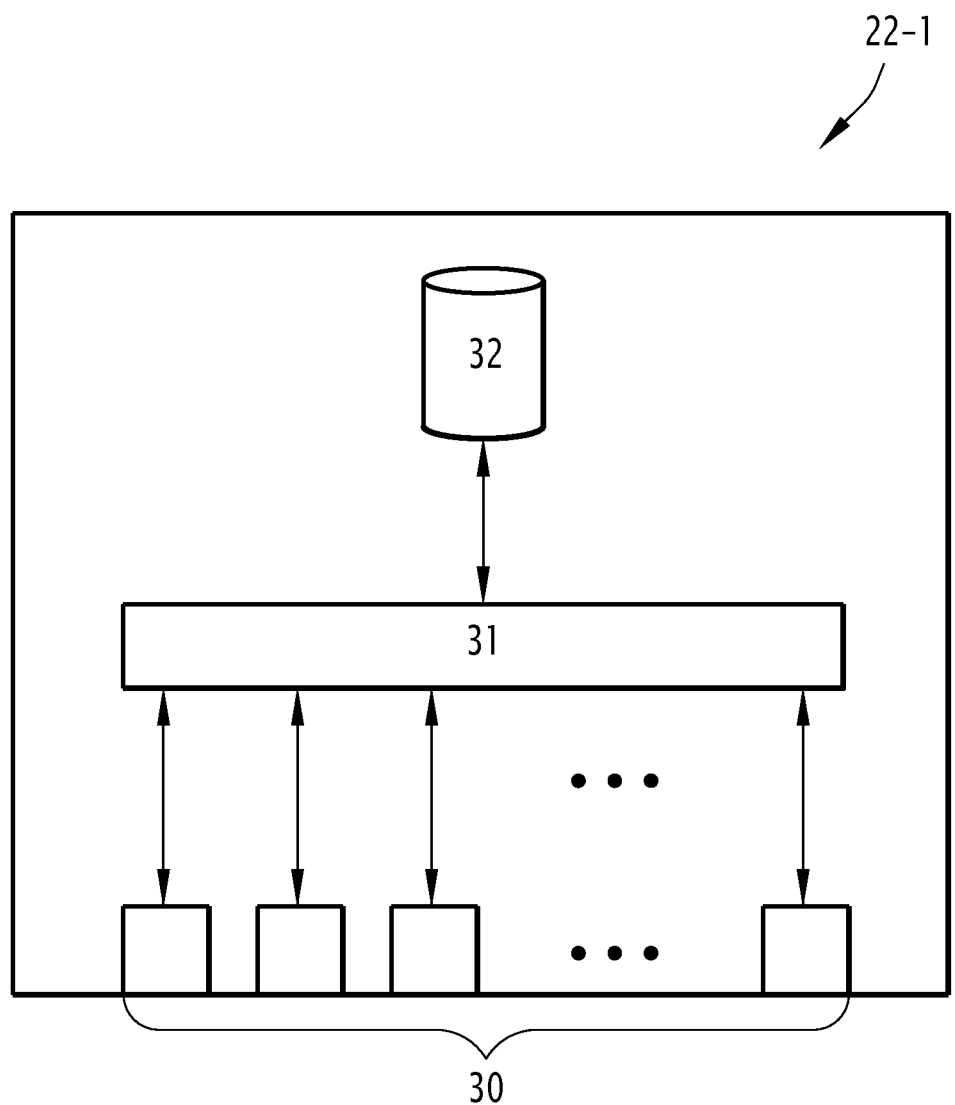
FIG. 2 is a detailed schematic view of one of the switches of FIG. 1.

As shown in this FIG. 2, the switch 22-1 comprises a plurality of ports 30, a conveying component 31 and a storage unit 32.

Each port 30 is an input and/or output port connecting the switch 22-1 to one of the end systems 24-1, ..., 24-M or to another switch 22-2, ..., 22-N.

The conveying component 31 makes it possible to convey each frame between an input port to an output port according to the configuration table of the corresponding switch 22-1. This configuration table is for example integrated into the conveying component 31.

The conveying component 31 also makes it possible, for example as a function of the value VL of each received frame, to copy the content of the wanted data field of this frame in order to store it in the storage unit 32.

In particular, according to one exemplary embodiment, in order for the content of the wanted data field of a frame to be copied, the value VL of this frame is stored in the configuration table of the conveying component 31 with a specific mention of the "to be stored" type.

The conveying component 31 also allows the reception of a corresponding request, to extract data stored in the storage unit 32 in order to send them to the avionic network using one or several data frames.

The storage unit 32 for example assumes the form of a physical component able to store digital data, such as a hard drive or a semiconductor mass memory.

Figure 3:
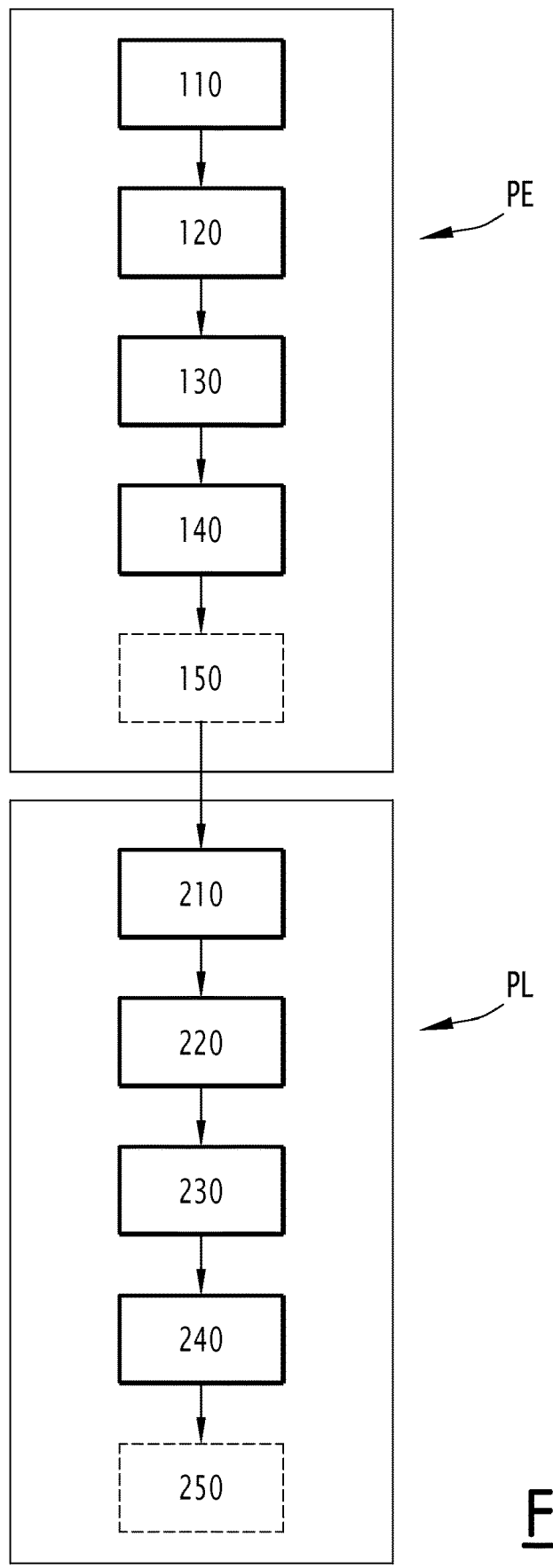
FIG. 3 is a flowchart of a storage method according to the invention, the method being carried out by the communication system of FIG. 1.

The method for storing digital files implemented by the communication system 20 will now be explained in reference to FIG. 3, showing a block diagram of its steps.

In particular, as shown in this FIG. 3, this storage method comprises a phase PE for writing digital files and a phase PL for reading digital files.

Each of these phases PE, PL will be explained hereinafter in detail in relation with a single digital file that is called digital file to be stored in the writing phase PE and digital file to be read in the reading phase PL. The case of multiple files is handled similarly.

The writing phase PE is launched by a sending end system 24-1, ..., 24-M when it needs to store a digital file.

In particular, during the initial step 110 of this writing phase, the sending end system 24-1, ..., 24-M determines a digital file to be stored.

This digital file for example corresponds to an original digital file that the sending end system 24-1, ..., 24M has just modified or a new digital file created by the sending end system 24-1, ..., 24-M. In this last case, the new digital file will be considered hereinafter to be an original file.

Then, during the following step 120, the sending end system 24-1, ..., 24-M associates a time reference with the digital file that in particular determines the date of its creation or of its modification.

In particular, according to one exemplary embodiment, the associated time reference comprises a local date determined by the sending end system 24-1, ..., 24-M and a reference point relative to this sending end system 24-1, ..., 24-M.

The local date for example corresponds to the time of the end system determined by its internal clock.

The reference point relative to the sending end system 24-1, ..., 24-M makes it possible to compare the local date determined by this end system with the local dates of the other end systems.

In particular, according to one exemplary embodiment, the reference point relative to a sending end system 24-1, ..., 24-M is a starting number of this sending end system. In particular, according to this exemplary embodiment, the end systems 24-1, ..., 24-M of the communication system 20 are started in order, one after the other for example at regular time intervals. In this case, the startup numbers of the end systems 24-1, ..., 24-M make it possible to compare the local dates from these end systems to one another.

During the following step 130, the sending end system 24-1, ..., 24-M sends the digital file to be stored with the associated time reference to K separate switches using one or several data frames, the number K being less than or equal to the number N.

In particular, during this step, the sending end system 24-1, ..., 24-M forms one or several frames according to the transmission protocol of the avionic network by placing, in the wanted data frame of each of these frames, at least part of the file to be stored and/or at least part of the associated time reference.

Then, the sending equipment 24-1, ..., 24-M adds, to each formed frame, a header in particular comprising an identifier making it possible to determine, in a definite manner, the origin of this frame, which is, in the present case of the ARINC 664 P7 protocol, a virtual link.

Advantageously, the digital files to be stored corresponding to a same original file are transported by data frames having a same virtual link. In other words, in this case, different versions of a same original file are transported by data frames having a same virtual link.

Lastly, advantageously, the sending end system 24-1, ..., 24-M adds an integrity digest to each frame for example corresponding to a CRC (Cyclic Redundancy Check) field of that frame.

When the or each frame is formed, the sending end system 24-1, ..., 24-M transmits this or these frames to K switches 22-1 to 22-N.

This transmission is for example done in multicast mode, according to the terminology known in the state of the art.

During the following step 140, at least some of the K switches receive the digital file to be stored with the associated time reference.

In particular, during this step, the conveying component 31 of each of the switches having received the frame(s) transporting the digital file to be stored with the associated time reference, creates a copy of this file and stores it in the storage unit 32 with the associated time reference. This is done for example only when the virtual link for this or these frames is stored in the configuration table of the corresponding switch with the mention "to be stored".

Then, the conveying component 31 transmits the received frame(s) to another switch according to its configuration table.

According to one embodiment, the conveying component 31 creates a copy of the digital file to be stored only when the integrity digest of the or each frame transporting this file is verified.

Furthermore, according to one particular embodiment, the step 140 is a final step of the writing phase PE inasmuch as no verification of proper receipt of the file to be stored is done by the sending end system having sent this file.

This embodiment can be described as "shoot and forget".

According to another embodiment, the writing phase further comprises a step 150 during which the sending end system 24-1, . . . , 24-M having sent the file verifies that at least L switches among the K switches have received the digital file to be stored with the associated time reference. The number L is for example less than or equal to the number K.

Step 150 is for example carried out for each digital file to be stored or for only some of them as a function for example of the nature of this file.

The reading phase PL is launched by a receiving end system 24-1, . . . , 24-M wishing to read a digital file already stored using the communication system 20.

During the initial step 210 of this reading phase PL, the receiving end system 24-1, . . . , 24-M sends K requests to K separate switches 22-1 to 22-N in order to restore each copy of the file to be read stored in the storage unit 32 of these switches.

Each of these requests is sent using at least one frame according to the protocol of the avionic network.

Upon receipt of these requests, each of the concerned switches 22-1 to 22-N authenticates the corresponding request by the identifier of the frame having transported it. Thus, in the case of an avionic network of type ARINC 664 P7, it involves authentication by the value VL of the corresponding frames.

During the following step 220, the receiving end system 24-1, . . . , 24-M receives responses to at least some of the requests sent.

According to a first embodiment, each response comprises only the time reference associated with the corresponding copy of the file to be read.

According to a second embodiment, each response comprises the time reference associated with the corresponding copy of the file to be read and the copy itself of this file.

These responses are then sent by the switches having stored a copy of the file to be read.

Furthermore, according to one exemplary embodiment, this receiving step is finalized when the receiving end system 24-1, . . . , 24-M receives all of the responses to its requests.

According to another exemplary embodiment, the performance duration of this step is limited by a predetermined threshold. Thus, in this case, the receiving end system 24-1, . . . , 24-M receives only responses having arrived in a time interval then defined by this threshold and next goes to the following step.

During the following step 230, the receiving end system 24-1, . . . , 24-M analyzes the received time references and selects the time reference corresponding to the most recent moment in time.

This then corresponds to a vote making it possible to select the most recent version of the file to be read.

During the following step 240, the receiving end system 24-1, . . . , 24-M defines the file to be read by its copy associated with the selected time reference.

In particular, in the first embodiment, the receiving end system 24-1, . . . , 24-M recovers, from the corresponding switch, the copy of the file to be read associated with the selected time reference. To that end, it for example sends a request to this switch, which responds to this request by sending the requested copy to be read.

In the second embodiment, the receiving end system 24-1, . . . , 24-M determines the copy associated with the selected time reference among the copies received with the responses.

Optionally, the reading phase PL further comprises a verifying step 250, during which the receiving end system 24-1, . . . , 24-M verifies the integrity digest of the or each data frame transporting the copy of the file to be read associated with the selected time reference.

Thus, this copy is selected only when all of the integrity digests are verified.

One can then see that the present invention has a certain number of advantages.

In particular, the invention makes it possible to carry out a storage of digital files by using existing properties of avionic networks.

These properties in particular relate to the determinism of these networks, the predetermined routing and the definite identification of the frames.

This in particular makes it possible to implement the writing and reading phases of digital files particularly quickly and effectively, since no specific authentication step between the sending end system and the corresponding switch is necessary. It is indeed the identifier of the frames transporting the files to be stored or the requests to recover these files, that makes it possible to identify the origin of each frame in a definite manner. Thus, the invention proposes to associate, with each file, a list of identifiers to make it accessible to any frame having the identifier coming from this list. In the case of the communication protocol of type ARINC 664 P7, it is the value VL that corresponds to such an identifier.

This further makes it possible to naturally adjust the access rights to the digital files and the storage units because the avionic networks already provide such rights by their construction.

Lastly, the invention makes it possible to avoid the use of dedicated storage locations within the various avionic end systems.

The invention claimed is:

1. A storage method of digital files carried out by a determinist avionic network with predetermined routing;
the avionic network being implemented by a communication system comprising at least M end systems and at least N switches connected to one another;

each end system being sender and/or receiver of digital files;

each switch being able to send digital files over the avionic network using data frames, each of at least some switches comprising a storage unit configured to store at least some of these digital files;

each data frame comprising an identifier defining an origin of this frame in a definite manner;

the method comprising a phase for writing digital files comprising the following steps:

determining by a sender end system a digital file to be stored corresponding to a modified original file or a new created digital file;

associating a time reference with the digital file to be stored;

sending the digital file to be stored with the associated time reference to K separate switches using one or several data frames, the number K being less than or equal to the number N;

generating, via at least some of the switches, copy of the digital file to be stored and storing this copy in the storage unit of each of these switches with the associated time reference.

2. The method according to claim 1, wherein the time reference associated with the digital file to be stored comprises a local date determined by the sender end system having determined the digital file and a reference point relative to this sender end system.

3. The method according to claim 2, wherein the reference point relative to a sender end system is a starting number of this sender end system, the local date determined by this sender end system corresponding to the time elapsed since it was started.

4. The method according to claim 1, wherein the step for sending the digital file further comprises generating an integrity digest for the or each data frame transporting the digital file to be stored.

5. The method according to claim 4, wherein a copy of the digital file to be stored is stored in the storage unit of the switch intending to store said copy of the digital file only when the integrity digest of the or each frame transporting this file is verified.

6. The method according to claim 1, wherein:

the digital file to be stored is sent without verification of its receipt by the corresponding switches; or the method further comprises a step for verifying that at least L switches have received the digital file to be stored, the number L being less than or equal to the number K.

7. The method according to claim 1, wherein the avionic network is according to a communication protocol of type ARINC 664 P7.

8. The method according to claim 7, wherein the digital files to be stored corresponding to a same original file are transported by data frames having a same virtual link, each virtual link being defined by said communication protocol of type ARINC 664 P7.

9. The method according to claim 1, wherein the file to be stored is sent by the corresponding sender end system in multicast mode.

10. The method according to claim 1, further comprising a phase for reading digital files comprising the following steps:

sending K requests to K separate switches using a frame, in order to restore each copy of a file to be read stored in the storage unit of the corresponding switch;

receiving responses to at least some of the sent requests, each response comprising the time reference associated with the copy of the file to be read, stored by the switch having sent the response;

analyzing received time references and selecting the time reference corresponding to a most recent moment in time;

defining the file to be read by its copy associated with the selected time reference.

11. The method according to claim 10, wherein each of said responses further comprises the corresponding copy of the file to be read.

12. The method according to claim 10, wherein the step for defining the file to be read further comprises recovering the copy of the file to be read associated with the selected time reference.

13. The method according to claim 10, wherein an implementation duration of the step for receiving responses is limited by a predetermined threshold.

14. The method according to claim 10, wherein the reading phase further comprises a step for verifying an integrity digest of the or each data frame transporting the copy of the file to be read associated with the selected time reference.

15. The method according to claim 10, wherein each received request is authenticated by the corresponding switch by using the identifier of the frame transporting this request.

16. The method according to claim 15, wherein:

the avionic network is according to a communication protocol of type ARINC 664 P7;

each received request is authenticated by the corresponding switch by using a virtual link of the frame transporting this request, the virtual link being defined by said protocol.

17. An avionic communication system comprising at least M end systems and at least N switches connected to one another;

each switch comprising a plurality of ports, a conveying component and a storage unit; and each end system comprising a processor and a memory;

said end systems and switches being configured to carry out the method according to claim 1.

* * * * *